US010884447B2

(12) United States Patent
Chan (10) Patent No.: US 10,884,447 B2
(45) Date of Patent: Jan. 5, 2021

(54) HEIGHT EXTENSION OF ANALOG STICK

(71) Applicant: RAZER (ASIA-PACIFIC) PTE. LTD., Singapore (SG)

(72) Inventor: Chun Chiang Chan, Singapore (SG)

(73) Assignee: RAZER (ASIA-PACIFIC) PTE. LTD., Singapore (SG)

(*) Notice: Subject to any disclaimer, the term of this patent is extended or adjusted under 35 U.S.C. 154(b) by 0 days.

(21) Appl. No.: 16/638,042

(22) PCT Filed: Aug. 11, 2017

(86) PCT No.: PCT/SG2017/050401
§ 371 (c)(1),
(2) Date: Feb. 10, 2020

(87) PCT Pub. No.: WO2019/032042
PCT Pub. Date: Feb. 14, 2019

(65) Prior Publication Data
US 2020/0218305 A1    Jul. 9, 2020

(51) Int. Cl.
*G05G 5/06* (2006.01)
*A63F 13/24* (2014.01)
(Continued)

(52) U.S. Cl.
CPC ............... *G05G 5/06* (2013.01); *A63F 13/24* (2014.09); *G05G 1/04* (2013.01); *G05G 5/04* (2013.01);
(Continued)

(58) Field of Classification Search
CPC .................................................. G05G 2505/00
See application file for complete search history.

(56) References Cited

U.S. PATENT DOCUMENTS 7,781,686 B2    8/2010  Kramlich
8,834,272 B2    9/2014  Bleich et al.
(Continued)

FOREIGN PATENT DOCUMENTS

CN    203123534 U    8/2013
CN    106015225 A    10/2016
(Continued)

OTHER PUBLICATIONS

Extended European Search Report dated Jul. 2, 2020, 13 pages, for the corresponding European Patent Application No. 17921346.7.
(Continued)

*Primary Examiner* — Vicky A Johnson
(74) *Attorney, Agent, or Firm* — Polsinelli PC (57) ABSTRACT

An input device with adjustable height is provided. The input device may be an analog stick. The input device may include a cap and a base. The cap may include a top section and a connector. The connector may include a plurality of magnets over-moulded on the connector. The base may include a stem that defines a space into which the connector may be inserted thereby mounting the cap on the base. The stem may include a first metal structure and a second metal structure over-moulded on the stem. The connector may be held at a first position with regard to the stem when the plurality of magnets attaches to the first metal structure. The connector may be held at a second position with regard to the stem when the plurality of magnets attaches to the second metal structure.

20 Claims, 6 Drawing Sheets

FIG. 2A

FIG. 2B (51) Int. Cl.
*G05G 1/04* (2006.01)
*G05G 5/04* (2006.01)
*G06F 3/0338* (2013.01)
*G06F 3/039* (2013.01)

(52) U.S. Cl.
CPC .......... *G06F 3/039* (2013.01); *G06F 3/0338* (2013.01); *A63F 2300/1043* (2013.01); *G05G 2505/00* (2013.01)

(56) References Cited

U.S. PATENT DOCUMENTS

| | | | |
|---|---|---|---|
| 9,029,721 | B2 | 5/2015 | Ikeda et al. |
| 2006/0100059 | A1 | 5/2006 | Nonaka |
| 2008/0280681 | A1* | 11/2008 | Kidakarn ................ A63F 13/06 463/37 |
| 2009/0295724 | A1 | 12/2009 | Cheng et al. |
| 2010/0298053 | A1 | 11/2010 | Kotkin |
| 2015/0238855 | A1 | 8/2015 | Uy et al. |
| 2016/0361636 | A1* | 12/2016 | Gassoway ............... A63F 13/98 |
| 2017/0001106 | A1 | 1/2017 | Gassoway et al. |
| 2017/0261097 | A1* | 9/2017 | Yamanaka ............. B60K 20/02 |

FOREIGN PATENT DOCUMENTS

| | | |
|---|---|---|
| CN | 106151193 A | 11/2016 |
| CN | 106257064 A | 12/2016 |
| CN | 205841404 U | 12/2016 |
| CN | 205895801 U | 1/2017 |
| CN | 206072037 U | 4/2017 |
| JP | 2014-115747 A | 6/2014 |
| JP | 2014144084 A | 8/2014 |
| KR | 10-2005-0066655 A | 6/2005 |
| KR | 10-2006-0122219 A | 11/2006 |
| KR | 100627768 B1 | 7/2007 |
| WO | WO 2005/022285 A2 | 3/2005 |
| WO | WO 2005/055035 A1 | 6/2005 |
| WO | WO 2010-112814 | 10/2010 |

OTHER PUBLICATIONS

International Search Report and Written Opinion, dated May 2, 2018, for the corresponding International Application No. PCT/SG2017/050401 in 11 pages.
Xbox Elite Wireless Controller found at https://www.xbox.com/en-US/xbox-one/accessories/controllers/elite-wireless-controller in 8 pages.
Custom Controllers—Gaming Controls for Xbox and Playstation | SCUF Gaming found at https://scufgaming.com/int in 5 pages.
Kontrol Freeks, Performance Thumbsticks found at https://www.kontrolfreek.com/collections/thumbsticks in 3 pages.
Do your DS3 analog sticks pull up? | IGN Boards found at http://www.ign.com/boards/threads/do-your-ds3-analog-sticks-pull-up.452870_468/ in 7 pages.

* cited by examiner

HEIGHT EXTENSION OF ANALOG STICK

TECHNICAL FIELD

Various aspects of this disclosure generally relate to input devices, and more particularly, to an analog stick.

BACKGROUND

A gaming controller is a device used with games or entertainment systems to provide input to a video game, typically to control an object or character in the game. A gaming controller is usually connected to a game console or computer by means of a wire or cord, or wirelessly. Input devices that have been classified as gaming controllers may include keyboards, mouses, gamepads, joysticks, etc. Special purpose devices, such as steering wheels for driving games and light guns for shooting games, are also gaming controllers.

Gaming controllers have been designed and improved over the years to be as user friendly as possible. For example, gaming controllers may be designed to include directional pads, multiple buttons, analog sticks, joysticks, motion detection, touch screens and a plethora of other features to improve user experience.

An analog stick (may be referred to as a control stick, joystick, thumbstick, analog thumbstick, or stick) is an input device for a controller (e.g., a gaming controller) that is used for two-dimensional input. An analog stick may consist of a protrusion from the controller; input is based on the position of this protrusion in relation to the default "center" position. Analog sticks use continuous electrical activity running through potentiometers for movement in any direction within a two-dimensional space.

The height of an analog stick may be kept short to provide quicker and defter control. However, a user of a gaming controller may dislike using the analog stick of the controller to play First Person Shooter games due to the short height of the analog stick. When trying to shoot, a gamer may be unable to aim accurately due to low range of motion provided by the short analog stick. Removable analog sticks may allow users to switch a short analog stick by replacing it with a longer analog stick. However, having a removable analog stick means that the analog stick that is not in use is susceptible to loss. It could be frustrating for the user if she cannot find the analog stick when she wants to use it.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

The height of an analog stick may be kept short to provide quicker and defter control. However, a user of a gaming controller may dislike using the analog stick of the controller to play First Person Shooter games due to the short height of the analog stick. When trying to shoot, a gamer may be unable to aim accurately due to low range of motion provided by the short analog stick. With extension of the analog stick height, the gamer may have better control of the analog stick (e.g., having a greater range of motion), enabling the gamer to aim with higher precision when needed. The gamer may shorten the height of the analog stick to seek quicker and defter control of the analog stick when precision of the input is less critical.

In an aspect of the disclosure, an input device is provided. The input device may be an analog stick. The input device may include a cap configured to be manipulated to interact with an application program. The cap may include a top section and a connector that extends perpendicularly from a surface of the top section. The connector may include a plurality of magnets over-moulded on the connector. The input device may include a base. The base may include a stem that defines a space into which the connector may be inserted thereby mounting the cap on the base. The stem may include a first metal structure and a second metal structure over-moulded on the stem. The connector may be held at a first position with regard to the stem when the plurality of magnets attaches to the first metal structure. The connector may be held at a second position with regard to the stem when the plurality of magnets attaches to the second metal structure.

In another aspect of the disclosure, a method of operating an input device to interact with an application program is provided. The input device may be an analog stick. The method may configure the input device to have a first height. The input device may include a cap and a base. The cap may include a connector having a plurality of magnets over-moulded on the connector. The base may include a stem defining a space into which the connector may be inserted thereby mounting the cap on the base. To configure the input device to have the first height, the method may attach the plurality of magnets to a first metal structure over-moulded on the stem. The method may configure the input device to have a second height by attaching the plurality of magnets to a second metal structure over-moulded on the stem.

To the accomplishment of the foregoing and related ends, the one or more aspects include the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

DETAILED DESCRIPTION

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of an analog stick will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media may include a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

In one embodiment, an analog stick height extension mechanism is provided as an option for the gamers. Through the unique mechanism and design of the analog stick height extension, gamers may increase the height of the analog stick to their liking to help them aim better. Gamers may also reduce the height of the extended analog stick to its original height to achieve quicker and defter control. In one embodiment, the height of the analog stick may be adjusted without disassembly of the analog stick. No extra external objects are required to increase the height. The extension is not removable, thus not susceptible to being misplaced or otherwise getting lost. In one embodiment, the analog stick height extension mechanism may enable changing the height of the analog stick "on-the-fly" in the middle of the game. In one embodiment, the analog stick height extension mechanism may include robust catches to adjust between different heights and magnets to hold configurable parts of the analog stick in position.

Figure 1A:
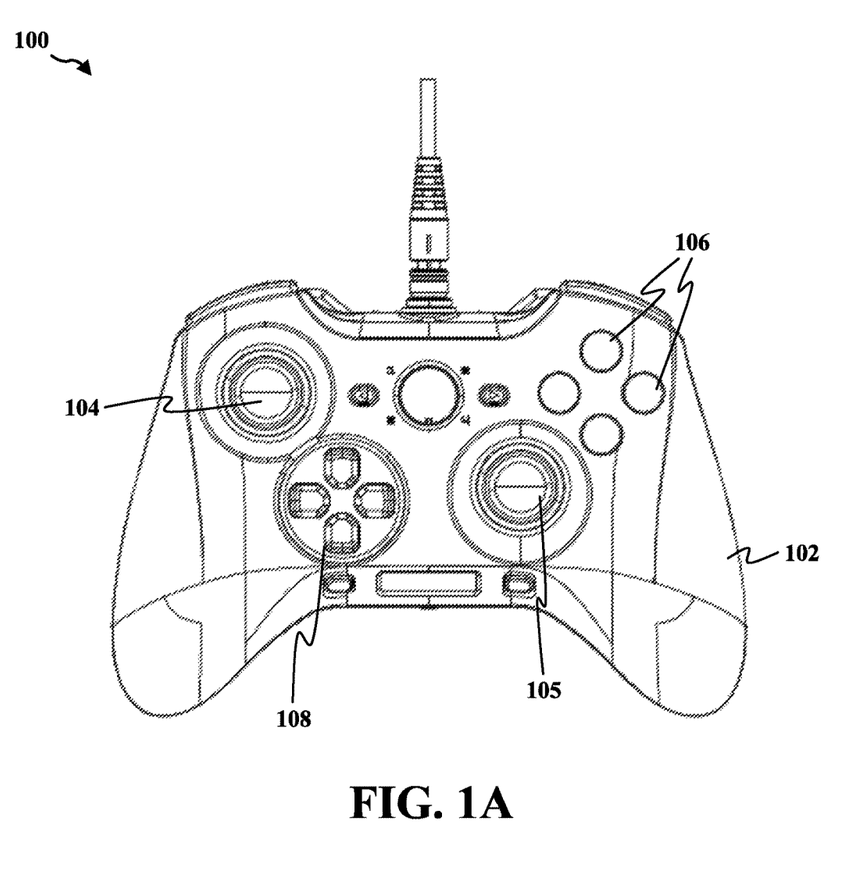
FIGS. 1A and 1B respectively illustrate a front view and a side view of an exemplary gaming controller.
Figure 1B:
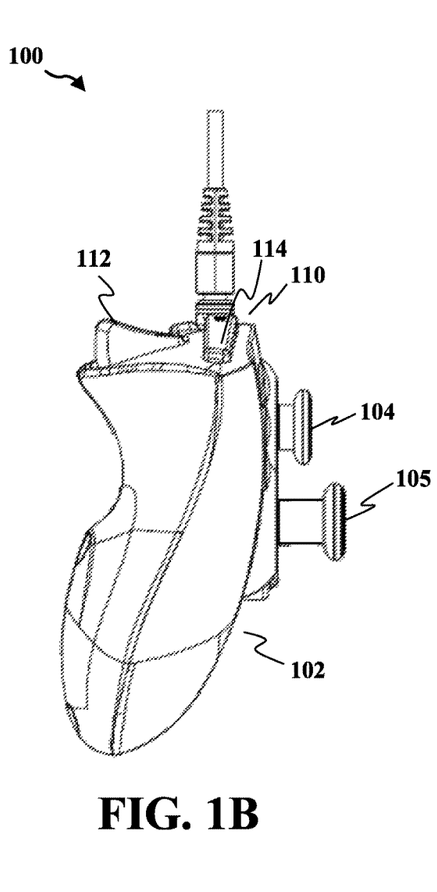

FIGS. 1A and 1B respectively illustrate a front view and a side view of an exemplary gaming controller 100. In one embodiment, the gaming controller 100 may include a top panel 102 and a front 110. The gaming controller 100 may have a set of game controls on the top panel 102 and the front 110. For example, analog sticks 104, 105, action buttons 106, and directional gamepads 108 may be placed on the top panel 102; multifunction triggers 112 and buttons 114 may be placed on the front 110. Each of the buttons 106 and 114 may be mapped to a gaming function.

Each of the analog sticks 104 and 105 may be tilted by a finger (e.g., the thumb) of a user. In the current example, analog stick 104 or 105 may be configured to tilt or pivot, when moved by a finger, relative to a stationary pivot point at an end of the analog stick 104 or 105, respectively. In FIGS. 1A and 1B, the hinge/pivot is internal to a housing of game controller 100, and thus not visible. However, the hinge/pivot may be visible in some embodiments. The gaming controller 100 or the analog sticks 104 and 105 may include mechanical and electrical components (e.g., sensors) that measure the degree of tilt of the analog sticks 104 and 105, and transmit an indication of the measured tilt (e.g., to one or more processors contained in the game controller 100 and/or in a remote component). In one embodiment, each of the analog sticks 104 and 105 may be extended to a taller height and switched back to its original height. For example, as illustrated in FIG. 1B, the analog stick 105 is extended to a taller height while the analog stick 104 remains at its original height.

According to various embodiments, the internal components of the gaming controller 100 may include an electronic circuit module (not shown). The electronic circuit module may include printed circuit boards, or any other suitable electronic circuit. The electronic circuit module may be coupled, by wire or wirelessly, to a gaming device. The buttons 106 and 114 may be configured to interact with the electronic circuit module of the gaming controller 100 for a user to provide inputs to the gaming device, to which the gaming controller 100 may be connected, via actuating the switches associated with buttons 106 and 114 of the gaming controller 100.

Figure 2A:
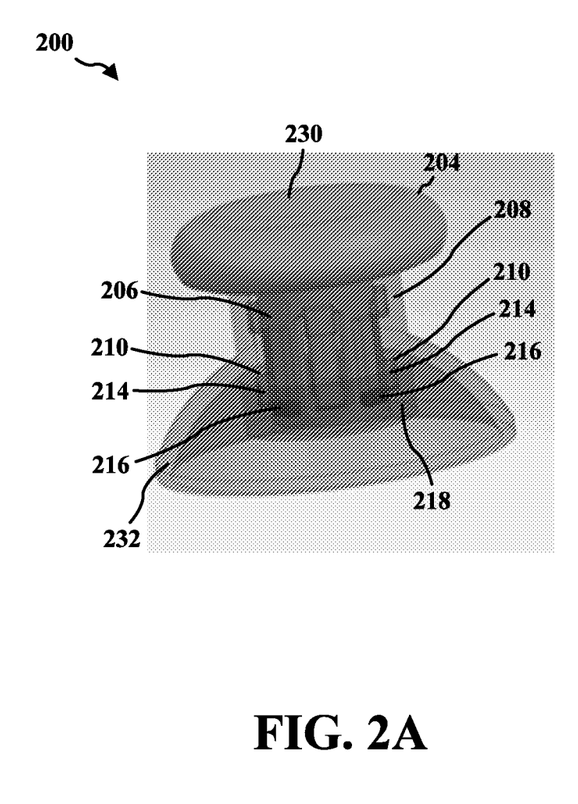
FIG. 2A is a diagram illustrating a perspective view of an example of an analog stick without height extension.

FIG. 2A is a diagram illustrating a perspective view of an example of an analog stick 200 without height extension. In one embodiment, the analog stick 200 may be one of the analog sticks 104 and 105 described above in FIG. 1. As illustrated in FIG. 2A, the analog stick 200 may include a cap 230 and a base 232. The cap 230 may be mounted on the base 232.

The cap 230 may include a top section 204 and a connector 206 extending perpendicularly from the bottom surface of the top section 204. In one embodiment, the top section 204 may be manipulated by a finger (e.g., the thumb) of a user to provide input to a variety of game functions. In one embodiment, the connector 206 may include a set of catch mechanisms 214 and a set of magnets 216 over-moulded on the connector 206. In one embodiment, the set of catch mechanisms 214 may be a set of protrusions over the surface of the connector 206. In one embodiment, the set of catch mechanisms 214 and the set of magnets 216 may be located near an end of the connector 206 that is away from the top section 204.

In one embodiment, the base 232 may include a cylindrical stem 208 surrounded by a dome-shaped base. The cylindrical stem 208 may define a space into which the connector 206 can be inserted thereby mounting the cap 230 on the base 232. In one embodiment, the cylindrical stem 208 may include a set of slots 210. In one embodiment, the set of slots 210 may snugly fit the set of catch mechanisms 214 to interlock the cylindrical stem 208 with the connector 206 at a particular position. In one embodiment, the set of slots 210 may interlock with the set of catch mechanisms 214 of the connector 206 to keep the connector 206 fully inserted into the cylindrical stem 208, thus maintaining the analog stick 200 at a shorter height.

In one embodiment, the cylindrical stem 208 may include a set of metals 218 over-moulded on the cylindrical stem 208. The set of metals 218 may be attached to the set of magnets 216 to keep the connector 206 fully inserted into the cylindrical stem 208, thus maintaining the analog stick 200 at a shorter height. In one embodiment, the set of slots 210 and the set of metals 218 may be located near the bottom of the cylindrical stem 208.

Figure 2B:
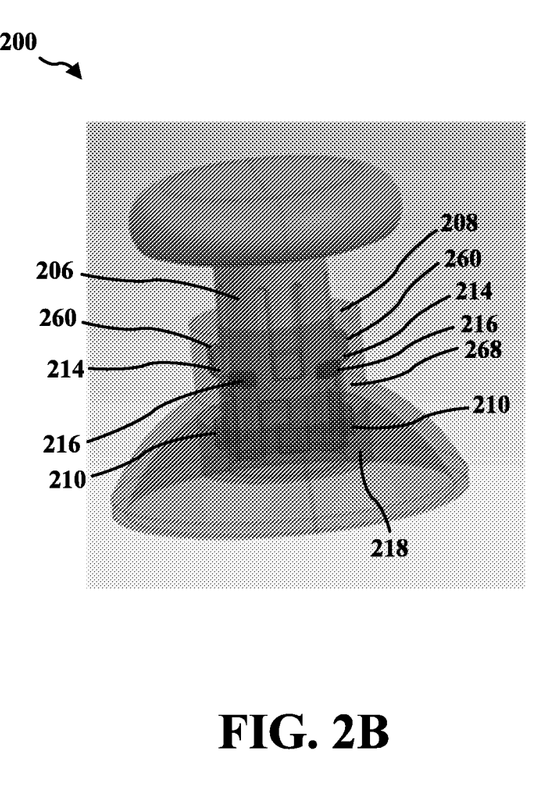
FIG. 2B is a diagram illustrating a perspective view of an example of the analog stick with height extension.

FIG. 2B is a diagram illustrating a perspective view of an example of the analog stick 200 with height extension. As illustrated in FIG. 2B, in one embodiment, the cylindrical stem 208 may include a set of slots 260 in addition to the set of slots 210. The set of slots 260 may be closer to the top of the cylindrical stem 208 than the set of slots 210. In one embodiment, the set of slots 260 may snugly fit the set of catch mechanisms 214 to interlock the cylindrical stem 208 with the connector 206 at a different position. In one embodiment, the set of slots 260 may interlock with the set of catch mechanisms 214 of the connector 206 to make the connector 206 partially inserted into the cylindrical stem 208, thus maintaining the analog stick 200 at a taller height.

In one embodiment, the cylindrical stem 208 may include a set of metals 268 over-moulded on the cylindrical stem 208. The set of metals 268 may be closer to the top of the cylindrical stem 208 than the set of metals 218. The set of metals 268 may be attached to the set of magnets 216 to keep the connector 206 partially inserted into the cylindrical stem 208, thus maintaining the analog stick 200 at a taller height. In one embodiment, the set of slots 260 and the set of metals 268 may be located near the top of the cylindrical stem 208.

In one embodiment, a user of the analog stick 200 may pull the cap 230 up to extend the height of the analog stick 200. When the height of the analog stick 200 is extended, the user may push the cap 230 down to reduce the height of the analog stick 200 to its original height.

Even though the sets of slots 210 and 260 are on the cylindrical stem 208 and the set of catch mechanisms 214 are on the connector 206 in the examples described above with reference to FIGS. 2A and 2B, one of ordinary skill in the art would recognize that the sets of slots 210 and 260 may be on the connector 206 and the set of catch mechanisms 214 may be on the cylindrical stem 208. Similarly, even though the sets of metals 218 and 268 are on the cylindrical stem 208 and the set of magnets 216 are on the connector 206 in the examples described above with reference to FIGS. 2A and 2B, one of ordinary skill in the art would recognize that the sets of metals 218 and 268 may be on the connector 206 and the set of magnets 216 may be on the cylindrical stem 208.

Figure 3A:
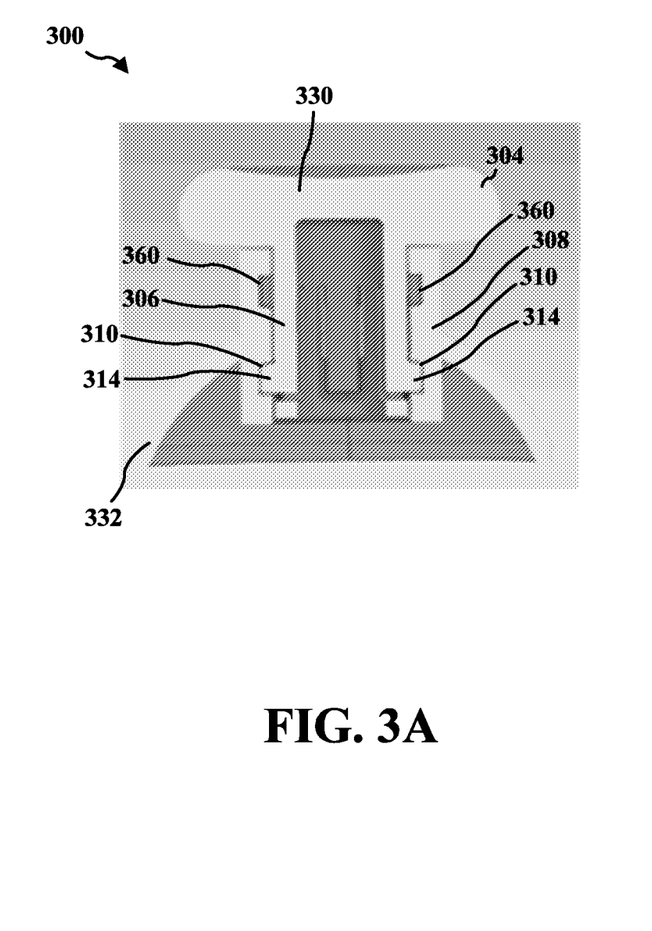
FIG. 3A is a diagram illustrating a cross-sectional view of an example of an analog stick without height extension.

FIG. 3A is a diagram illustrating a cross-sectional view of an example of an analog stick 300 without height extension. In one embodiment, the analog stick 300 may be one of the analog sticks 104 and 105 described above in FIG. 1. In one embodiment, the analog stick 300 may be the analog stick 200 described above in FIGS. 2A and 2B. As illustrated in FIG. 3A, the analog stick 300 may include a cap 330 and a base 332. The cap 330 may be mounted on the base 332.

The cap 330 may include a top section 304 and a connector 306 extending perpendicularly from the bottom surface of the top section 304. In one embodiment, the top section 304 may be manipulated by a finger (e.g., the thumb) of a user to provide input to a variety of game functions. In one embodiment, the connector 306 may include a set of catch mechanisms 314. In one embodiment, the set of catch mechanisms 314 may be a set of protrusions over the surface of the connector 306. In one embodiment, the set of catch mechanisms 314 may be located near an end of the connector 306 that is away from the top section 304.

In one embodiment, the base 332 may include a cylindrical stem 308 surrounded by a dome-shaped base. The cylindrical stem 308 may define a space into which the connector 306 can be inserted thereby mounting the cap 330 on the base 332. In one embodiment, the cylindrical stem 308 may include a first set of slots 310 and a second set of slots 360. In one embodiment, each of the set of slots 310 and 360 may snugly fit the set of catch mechanisms 314 to interlock the cylindrical stem 308 with the connector 306 at a particular position. In one embodiment, the set of slots 310 may interlock with the set of catch mechanisms 314 of the connector 306 to keep the connector 306 fully inserted into the cylindrical stem 308, thus maintaining the analog stick 300 at a shorter height. In one embodiment, the set of slots 310 may be located near the bottom of the cylindrical stem 308.

Figure 3B:
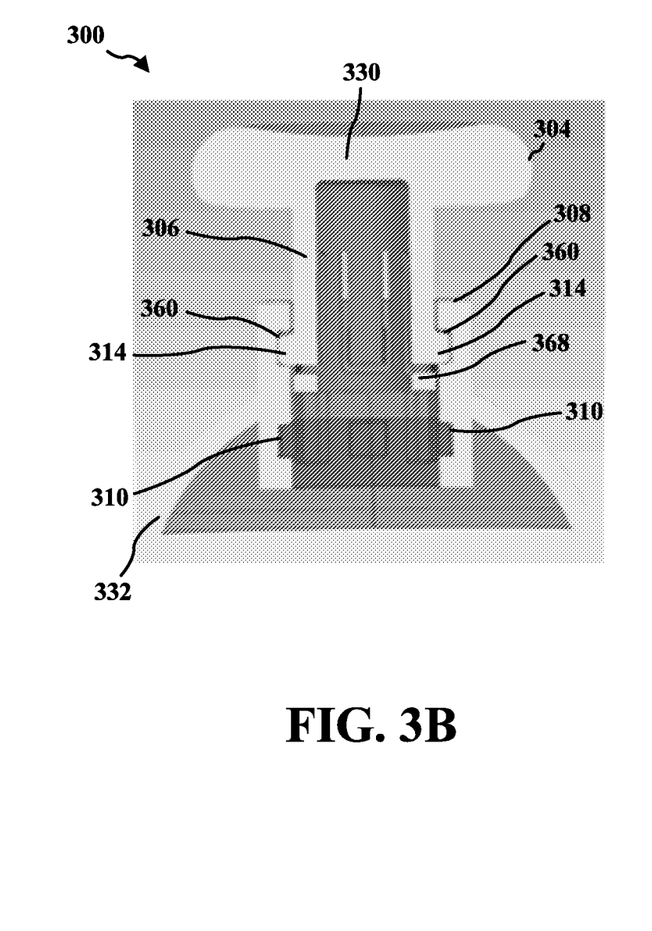
FIG. 3B is a diagram illustrating a cross-sectional view of an example of the analog stick with height extension.

FIG. 3B is a diagram illustrating a cross-sectional view of an example of the analog stick 300 with height extension. As illustrated in FIG. 3B, in one embodiment, the set of slots 360 may be closer to the top of the cylindrical stem 308 than the set of slots 310. In one embodiment, the set of slots 360 may interlock with the set of catch mechanisms 314 of the connector 306 to make the connector 306 partially inserted into the cylindrical stem 308, thus maintaining the analog stick 300 at a taller height. In one embodiment, the set of slots 360 may be located near the top of the cylindrical stem 308.

In one embodiment, a user of the analog stick 300 may pull the cap 330 up to extend the height of the analog stick 300. When the height of the analog stick 300 is extended, the user may push the cap 330 down to reduce the height of the analog stick 300 to its original height.

Even though the sets of slots 310 and 360 are on the cylindrical stem 308 and the set of catch mechanisms 314 are on the connector 306 in the examples described above with reference to FIGS. 3A and 3B, one of ordinary skill in the art would recognize that the sets of slots 310 and 360 may be on the connector 306 and the set of catch mechanisms 314 may be on the cylindrical stem 308.

Figure 4A:
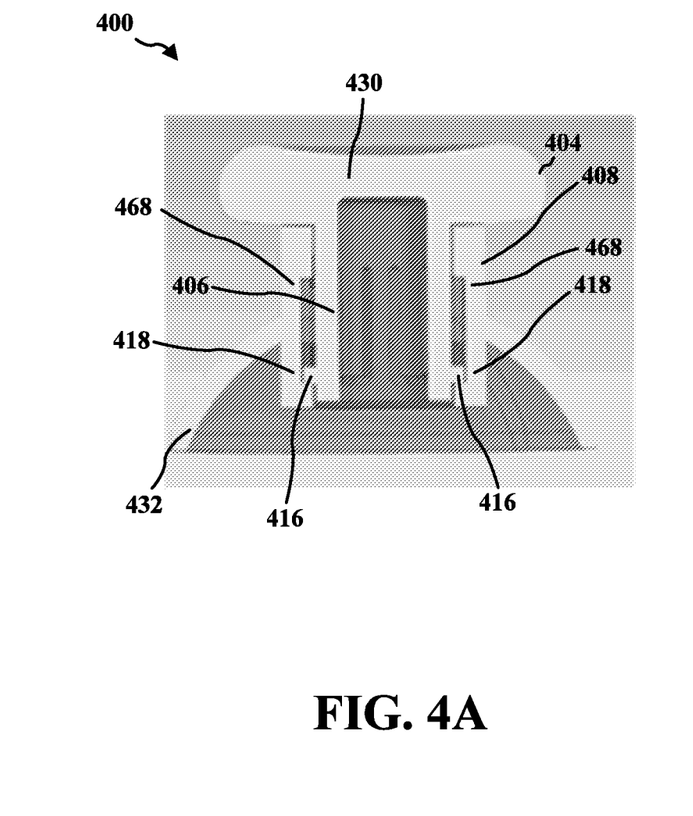
FIG. 4A is a diagram illustrating a cross-sectional view of an example of another analog stick without height extension.

FIG. 4A is a diagram illustrating a cross-sectional view of an example of another analog stick 400 without height extension. In one embodiment, the analog stick 400 may be one of the analog sticks 104 and 105 described above in FIG. 1. In one embodiment, the analog stick 400 may be the analog stick 200 described above in FIGS. 2A and 2B. As illustrated in FIG. 4A, the analog stick 400 may include a cap 430 and a base 432. The cap 430 may be mounted on the base 432.

The cap 430 may include a top section 404 and a connector 406 extending perpendicularly from the bottom surface of the top section 404. In one embodiment, the top section 404 may be manipulated by a finger (e.g., the thumb) of a user to provide input to a variety of game functions. In one embodiment, the connector 406 may include a set of magnets 416 over-moulded on the connector 406. In one embodiment, the set of magnets 416 may be located near an end of the connector 406 that is away from the top section 404.

In one embodiment, the base 432 may include a cylindrical stem 408 surrounded by a dome-shaped base. The cylindrical stem 408 may define a space into which the connector 406 can be inserted thereby mounting the cap 430 on the base 432. In one embodiment, the cylindrical stem 408 may include a first set of metals 418 and a second set of metals 468 over-moulded on the cylindrical stem 408. The set of metals 418 may be attached to the set of magnets 416 to keep the connector 406 fully inserted into the cylindrical stem 408, thus maintaining the analog stick 400 at a shorter height. In one embodiment, the set of metals 418 may be located near the bottom of the cylindrical stem 408.

Figure 4B:
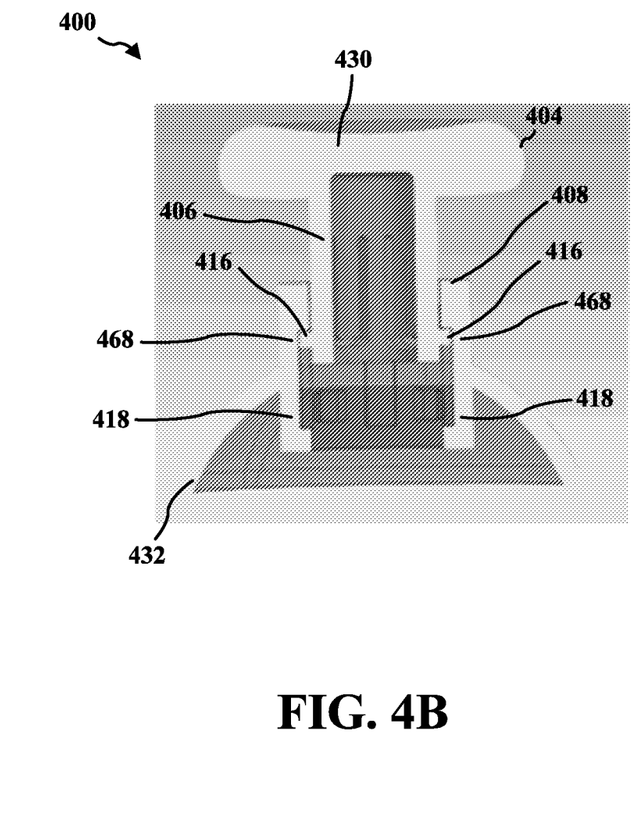
FIG. 4B is a diagram illustrating a cross-sectional view of an example of the analog stick with height extension.

FIG. 4B is a diagram illustrating a cross-sectional view of an example of the analog stick 400 with height extension. As illustrated in FIG. 4B, in one embodiment, the set of metals 468 may be closer to the top of the cylindrical stem 408 than the set of metals 418. The set of metals 468 may be attached to the set of magnets 416 to keep the connector 406 partially inserted into the cylindrical stem 408, thus maintaining the analog stick 400 at a taller height. In one embodiment, the set of metals 468 may be located near the top of the cylindrical stem 408.

In one embodiment, a user of the analog stick 400 may pull the cap 430 up to extend the height of the analog stick 400. When the height of the analog stick 400 is extended, the user may push the cap 430 down to reduce the height of the analog stick 400 to its original height.

Even though the sets of metals 418 and 468 are on the cylindrical stem 408 and the set of magnets 416 are on the connector 406 in the examples described above with reference to FIGS. 4A and 4B, one of ordinary skill in the art would recognize that the sets of metals 418 and 468 may be on the connector 406 and the set of magnets 416 may be on the cylindrical stem 408.

Figure 5:
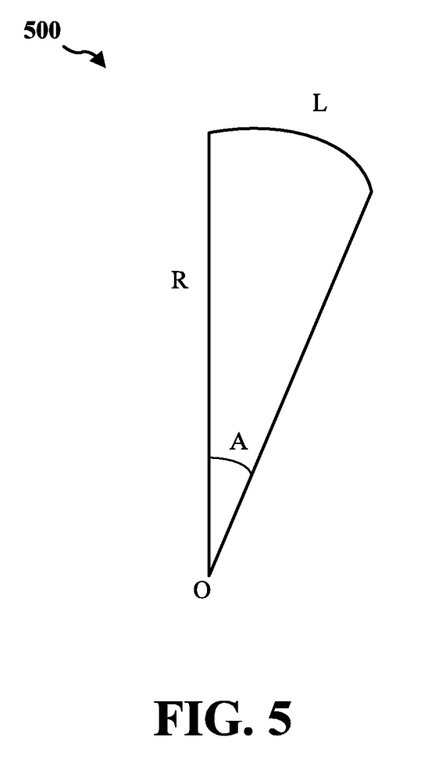
FIG. 5 is a diagram illustrating an example of extending the height of an analog stick to improve control precision of the analog stick.

FIG. 5 is a diagram 500 illustrating an example of extending the height of an analog stick to improve control precision of the analog stick. In one embodiment, the analog stick may be the analog stick 200, 300, or 400 described above. In this example, R represents the radius of a circle whose center is O. In one embodiment, O may be one end of the analog stick that is the pivot point of the analog stick. In such an embodiment, R may be the height of the analog stick, and A may be the maximum angle that the analog can tilt or pivot. L may be the length of an arc of the circle corresponding to the angle A. In one embodiment, L may be the range of motion of the analog stick. L may be calculated by, $$L = \left(\frac{A}{360}\right) \times 2\pi \times R$$

When the height of the analog stick is extended, the range of motion of the analog stick may be increased accordingly. For example, if the height $R_0$ of the analog stick without extension is 21.70 mm and the height $R_1$ of the analog stick with extension is 26.70 mm, for every one degree of A, $$L_0 = \left(\frac{1}{360}\right) \times 2\pi \times 21.7 = 0.76 \text{ mm}$$

$$L_1 = \left(\frac{1}{360}\right) \times 2\pi \times 26.7 = 0.93 \text{ mm}$$

Therefore, because of the height is increase from 21.70 mm to 26.70 mm, the range of motion of the analog stick for every degree of angle that the analog stick can be tilted or pivoted is increased from 0.76 mm to 0.93 mm, which is a 22.4% increase. As mentioned above, First Person Shooter games have not been popular in console games partly due to the hard-to-use analog sticks in aiming and maneuvering around. The range of motion of the analog stick is designed to cater for all games generally, but for First Person Shooter games, it is not sufficient in term of control accuracy. When trying to shoot, gamers are unable to aim accurately due to its low range of motion. The increased height of the analog stick may help with the control of the analog stick by increasing the range of motion. For every degree, there may be a 22.4% increase of radial length with an increase of 5 mm height. In other words, there may be a 22.4% increase of range of motion with an increase of 5 mm height, which improves the precision.

In one embodiment, a gamer may pull the analog stick to increase the height by 5 mm and push it back down to the original position. The extendable analog stick does not need any external objects or extra parts to extend the height of the analog stick, thus may be more cost effective and may eliminate the chance of losing the external objects or extra parts. In one embodiment, a gamer may be able to increase and decrease height "on-the-fly" using the analog stick due to internal mechanism rather than external parts. A user may be able to enjoy First Person Shooter games more with the increased height of the analog stick by pulling the analog stick up. For other games, the user may simply push the height back to the original height to enjoy other games that require less accuracy.

In one embodiment, the interlocking of the catch mechanisms with different set of slots may provide a way for the user to quickly adjusting the height of the analog stick (e.g., pulling up or pushing down the cap) to switch between game functions that require high accuracy and game functions that require less accuracy but quicker control, thus improving user experience or gaming experience. Similarly, the attaching of the magnets to different sets of metals may also provide a way for the user to quickly adjusting the height of the analog stick (e.g., pulling up or pushing down the cap) to switch between game functions that require high accuracy and game functions that require less accuracy but quicker control. In one embodiment, these two mechanisms may be combined to achieve similar effects, as illustrated in FIGS. 2A and 2B.

In one aspect, an input device (e.g., the analog stick 200, 300, or 400) is provided. The input device may include a cap (e.g., the cap 230, 330, or 430) configured to be manipulated to interact with an application program. The cap may include a top section (e.g., the top section 204, 304, or 404) and a connector (e.g., the connector 206, 306, or 406) that extends perpendicularly from a surface of the top section. The connector may include a plurality of magnets (e.g., the set of magnets 216 or 416) over-moulded on the connector. The input device may include a base (e.g., the base 232, 332, or 432) comprising a stem (e.g., the cylindrical stem 208, 308, or 408). The stem may define a space into which the connector is inserted thereby mounting the cap on the base. The stem may include a first metal structure (e.g., the set of metals 218 or 418) over-moulded on the stem. The stem may include a second metal structure (e.g., the set of metals 268 or 468) over-moulded on the stem. The connector may be held at a first position with regard to the stem (e.g., fully inserted) when the plurality of magnets attaches to the first metal structure. The connector may be held at a second position with regard to the stem (e.g., partially inserted) when the plurality of magnets attaches to the second metal structure.

In one embodiment, the connector may further include a plurality of catch mechanisms (e.g., the set of catch mechanisms 214 or 314). The stem may further include a first set of slots (e.g., the set of slots 210 or 310) and a second set of slots (e.g., the set of slots 260 or 360). In one embodiment, the first set of slots may interlock with the plurality of catch mechanisms to hold the connector at the first position. The second set of slots may interlock with the plurality of catch mechanisms to hold the connector at the second position.

In one embodiment, the stem may have a first end and a second end. The second end of the stem may be closer to the top section of the cap than the first end of the stem when the cap is mounted on the base. In one embodiment, the first metal structure may be closer to the first end of the stem than the second metal structure. In one embodiment, the first set of slots may be closer to the first end of the stem than the second set of slots.

In one embodiment, the input device may have a first height when the connector is held at the first position. The input device may have a second height when the connector is held at the second position. The second height may be greater than the first height. In one embodiment, the input device may have a first range of motion at the first height, and the input device may have a second range of motion at the second height. The second range of motion may be larger than the first range of motion. In one embodiment, the connector may switch between the first position and the second position during execution of the application program.

Figure 6:
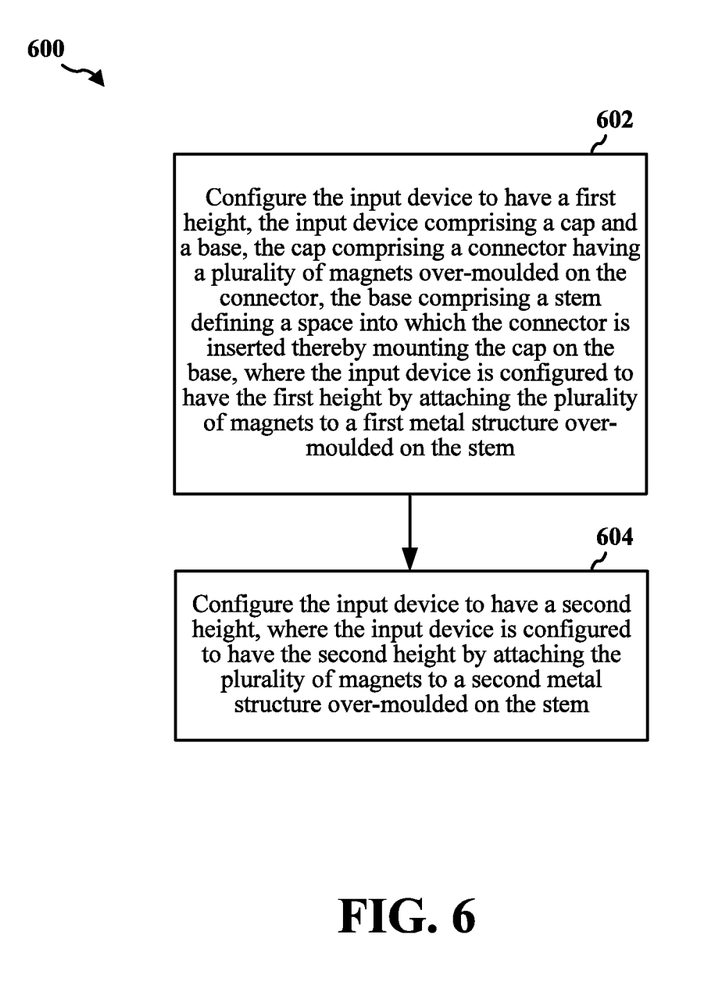
FIG. 6 is a flowchart of a method of operating an input device to interact with an application program.

FIG. 6 is a flowchart 600 of a method of operating an input device to interact with an application program. In one embodiment, the input device may be part of or coupled to a gaming device. In one embodiment, the input device may be the analog stick 104, 105, 200, 300, or 400 described above.

At 602, the method may configure the input device to have a first height. The input device may include a cap and a base. The cap may include a connector having a plurality of magnets over-moulded on the connector. The base may include a stem defining a space into which the connector is inserted thereby mounting the cap on the base. The input device may be configured to have the first height by attaching the plurality of magnets to a first metal structure over-moulded on the stem.

At 604, the method may configure the input device to have a second height. The input device may be configured to have the second height by attaching the plurality of magnets to a second metal structure over-moulded on the stem. In one embodiment, the connector may be held at a first position with regard to the stem when the plurality of magnets attaches to the first metal structure; and the connector may be held at a second position with regard to the stem when the plurality of magnets attaches to the second metal structure.

In one embodiment, the connector may further include a plurality of catch mechanisms. The stem may further include a first set of slots and a second set of slots. In one embodiment, the first set of slots may interlock with the plurality of catch mechanisms to hold the connector at the first position. The second set of slots may interlock with the plurality of catch mechanisms to hold the connector at the second position.

In one embodiment, the cap may further include a top section. The connector may extend perpendicularly from a surface of the top section. The stem may have a first end and a second end. The second end of the stem may be closer to the top section of the cap than the first end of the stem when the cap is mounted on the base. In one embodiment, the first metal structure may be closer to the first end of the stem than the second metal structure. In one embodiment, the first set of slots may be closer to the first end of the stem than the second set of slots.

In one embodiment, the second height may be greater than the first height. In one embodiment, the input device may have a first range of motion at the first height; and the input device may have a second range of motion at the second height. The second range of motion may be larger than the first range of motion. In one embodiment, the input device may be configured to switch between the first height and the second height during execution of the application program.

In the following, various aspects of this disclosure will be illustrated:

Example 1 is an input device. The input device may include a cap configured to be manipulated to interact with an application program. The cap may include a top section and a connector that extends perpendicularly from a surface of the top section. The connector may include a plurality of magnets over-moulded on the connector. The input device may include a base comprising a stem. The stem may define a space into which the connector is inserted thereby mounting the cap on the base. The stem may include a first metal structure over-moulded on the stem, and a second metal structure over-moulded on the stem. The connector may be held at a first position with regard to the stem when the plurality of magnets attaches to the first metal structure. The connector may be held at a second position with regard to the stem when the plurality of magnets attaches to the second metal structure.

In Example 2, the subject matter of Example 1 may optionally include that the connector may further include a plurality of catch mechanisms, and the stem may further include a first set of slots and a second set of slots.

In Example 3, the subject matter of Example 2 may optionally include that the first set of slots may interlock with the plurality of catch mechanisms to hold the connector at the first position, and the second set of slots may interlock with the plurality of catch mechanisms to hold the connector at the second position.

In Example 4, the subject matter of any one of Examples 1 to 3 may optionally include that the stem may have a first end and a second end, where the second end of the stem may be closer to the top section of the cap than the first end of the stem when the cap is mounted on the base.

In Example 5, the subject matter of Example 4 may optionally include that the first metal structure may be closer to the first end of the stem than the second metal structure.

In Example 6, the subject matter of Example 4 may optionally include that the first set of slots may be closer to the first end of the stem than the second set of slots.

In Example 7, the subject matter of any one of Examples 1 to 6 may optionally include that the input device may have a first height when the connector is held at the first position, and the input device may have a second height when the connector is held at the second position. The second height may be greater than the first height.

In Example 8, the subject matter of Example 7 may optionally include that the input device may have a first range of motion at the first height, and the input device may have a second range of motion at the second height. The second range of motion may be larger than the first range of motion.

In Example 9, the subject matter of any one of Examples 1 to 8 may optionally include that the input device may be an analog stick.

In Example 10, the subject matter of any one of Examples 1 to 9 may optionally include that the connector may switch between the first position and the second position during execution of the application program.

Example 11 is a method of operating an input device to interact with an application program. The method may configure the input device to have a first height. The input device may include a cap and a base. The cap may include a connector having a plurality of magnets over-moulded on the connector. The base may include a stem defining a space into which the connector is inserted thereby mounting the cap on the base. To configure the input device to have the first height, the method may attach the plurality of magnets to a first metal structure over-moulded on the stem. The method may configure the input device to have a second height. To configure the input device to have the second height, the method may attach the plurality of magnets to a second metal structure over-moulded on the stem.

In Example 12, the subject matter of Example 11 may optionally include that the connector may be held at a first position with regard to the stem when the plurality of magnets attaches to the first metal structure, and the connector may be held at a second position with regard to the stem when the plurality of magnets attaches to the second metal structure In Example 13, the subject matter of any one of Examples 11 to 12 may optionally include that the connector may further include a plurality of catch mechanisms, and the stem may further include a first set of slots and a second set of slots.

In Example 14, the subject matter of Example 13 may optionally include that the first set of slots may interlock with the plurality of catch mechanisms to hold the connector at the first position, and the second set of slots may interlock with the plurality of catch mechanisms to hold the connector at the second position.

In Example 15, the subject matter of any one of Examples 11 to 14 may optionally include that the cap may further include a top section, and the connector may extend perpendicularly from a surface of the top section.

In Example 16, the subject matter of Example 15 may optionally include that the stem may have a first end and a second end, and the second end of the stem may be closer to the top section of the cap than the first end of the stem when the cap is mounted on the base.

In Example 17, the subject matter of Example 16 may optionally include that the first metal structure may be closer to the first end of the stem than the second metal structure.

In Example 18, the subject matter of Example 16 may optionally include that the first set of slots may be closer to the first end of the stem than the second set of slots.

In Example 19, the subject matter of any one of Examples 11 to 18 may optionally include that the second height may be greater than the first height.

In Example 20, the subject matter of Example 19 may optionally include that the input device may have a first range of motion at the first height, and the input device may have a second range of motion at the second height, the second range of motion being larger than the first range of motion.

In Example 21, the subject matter of any one of Examples 11 to 20 may optionally include that the input device may be an analog stick.

In Example 22, the subject matter of any one of Examples 11 to 21 may optionally include that the input device may be configured to switch between the first height and the second height during execution of the application program.

It will be appreciated to a person skilled in the art that the terminology used herein is for the purpose of describing various embodiments only and is not intended to be limiting of the present invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

It is understood that the specific order or hierarchy of blocks in the processes/flowcharts disclosed is an illustration of exemplary approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

What is claimed is:

1. An input device, comprising:
   a cap configured to be manipulated to interact with an application program, the cap comprising:
      a top section; and
      a connector that extends perpendicularly from a surface of the top section, the connector comprising a plurality of magnets over-moulded on the connector; and
   a base comprising a stem, the stem defining a space into which the connector is inserted thereby mounting the cap on the base, the stem comprising:
      a first metal structure over-moulded on the stem; and
      a second metal structure over-moulded on the stem,
   wherein the connector is held at a first position with regard to the stem when the plurality of magnets attaches to the first metal structure,
   wherein the connector is held at a second position with regard to the stem when the plurality of magnets attaches to the second metal structure.

2. The input device of claim 1, wherein the stem is a cylindrical stem.

3. The input device of claim 1, wherein the first metal structure comprises a first set of metals.

4. The input device of claim 1, wherein the second metal structure comprises a second set of metals.

5. The input device of claim 1, wherein the connector further comprises a plurality of catch mechanisms, wherein the stem further comprises a first set of slots and a second set of slots.

6. The input device of claim 5, wherein the first set of slots interlocks with the plurality of catch mechanisms to hold the connector at the first position, wherein the second set of slots interlocks with the plurality of catch mechanisms to hold the connector at the second position.

7. The input device of claim 1, wherein the stem has a first end and a second end, wherein the second end of the stem is closer to the top section of the cap than the first end of the stem when the cap is mounted on the base.

8. The input device of claim 7, wherein the first metal structure is closer to the first end of the stem than the second metal structure.

9. The input device of claim 7, wherein the first set of slots is closer to the first end of the stem than the second set of slots.

10. The input device of claim 1, wherein the input device has a first height when the connector is held at the first position, wherein the input device has a second height when the connector is held at the second position, the second height being greater than the first height.

11. The input device of claim 10, wherein the input device has a first range of motion at the first height, wherein the input device has a second range of motion at the second height, the second range of motion being larger than the first range of motion.

12. The input device of claim 1, wherein the input device is an analog stick.

13. The input device of claim 1, wherein the connector switches between the first position and the second position during execution of the application program.

14. A method of operating an input device to interact with an application program, comprising:
   configuring the input device to have a first height, the input device comprising a cap and a base, the cap comprising a connector having a plurality of magnets over-moulded on the connector, the base comprising a stem defining a space into which the connector is inserted thereby mounting the cap on the base, wherein the configuring the input device to have the first height comprises attaching the plurality of magnets to a first metal structure over-moulded on the stem; and
   configuring the input device to have a second height, wherein the configuring the input device to have the second height comprises attaching the plurality of magnets to a second metal structure over-moulded on the stem.

15. The method of claim 14, wherein the connector is held at a first position with regard to the stem when the plurality of magnets attaches to the first metal structure, wherein the connector is held at a second position with regard to the stem when the plurality of magnets attaches to the second metal structure.

16. The method of claim 14, wherein the connector further comprises a plurality of catch mechanisms, wherein the stem further comprises a first set of slots and a second set of slots.

17. The method of claim 16, wherein the first set of slots interlocks with the plurality of catch mechanisms to hold the connector at the first position, wherein the second set of slots interlocks with the plurality of catch mechanisms to hold the connector at the second position.

18. The method of claim 14, wherein the cap further comprises a top section, wherein the connector extends perpendicularly from a surface of the top section.

19. The method of claim 18, wherein the stem has a first end and a second end, wherein the second end of the stem is closer to the top section of the cap than the first end of the stem when the cap is mounted on the base, wherein the first metal structure is closer to the first end of the stem than the second metal structure.

20. The method of claim 14, wherein the second height is greater than the first height, wherein the input device has a first range of motion at the first height, wherein the input device has a second range of motion at the second height, the second range of motion being larger than the first range of motion.

* * * * *